United States Patent [19]
Eaton

[11] 3,750,762
[45] Aug. 7, 1973

[54] SPEED CONTROL SYSTEM FOR VEHICLE MOUNTING A WORK PERFORMING DEVICE

[75] Inventor: William C. Eaton, Omaha, Nebr.

[73] Assignee: Omsteel Industries, Inc., Omaha, Nebr.

[22] Filed: Aug. 19, 1971

[21] Appl. No.: 173,025

[52] U.S. Cl............ 173/8, 37/86, 37/DIG. 1, 37/DIG. 17, 91/412, 172/8, 173/24, 180/53 CD
[51] Int. Cl............................................. E02f 5/06
[58] Field of Search .................... 173/4-9, 173/24; 56/DIG. 15; 37/DIG. 1, DIG. 17, 86; 60/494; 91/412; 172/8; 180/53 CD, 66, 105 R

[56] References Cited
UNITED STATES PATENTS

| | | | |
|---|---|---|---|
| 3,605,903 | 9/1971 | Glesmann | 37/86 X |
| 2,804,751 | 9/1957 | Schroeder | 173/8 |
| 2,136,921 | 11/1938 | Joy | 37/DIG. 1 |
| 3,548,570 | 12/1970 | Knott et al. | 37/94 X |
| 3,093,946 | 6/1963 | Pitt et al. | 56/DIG. 15 |

FOREIGN PATENTS OR APPLICATIONS

| | | | |
|---|---|---|---|
| 141,104 | 2/1961 | U.S.S.R. | 37/DIG. 1 |

Primary Examiner—Robert E. Pulfrey
Assistant Examiner—Clifford D. Crowder
Attorney—Alex A. Hofgren, Ernest A. Wegner et al.

[57] ABSTRACT

A speed control system for a vehicle mounting a work performing device such as a trencher for controlling the speed of the vehicle inversely to the amount of work being performed by the work performing device. The vehicle includes a hydraulic drive motor and apparatus is provided for sensing the amount of work to be performed by the work performing device and for selectively controlling the flow of hydraulic fluid in a bypass for the hydraulic drive motor to thereby control the speed of the vehicle.

5 Claims, 2 Drawing Figures

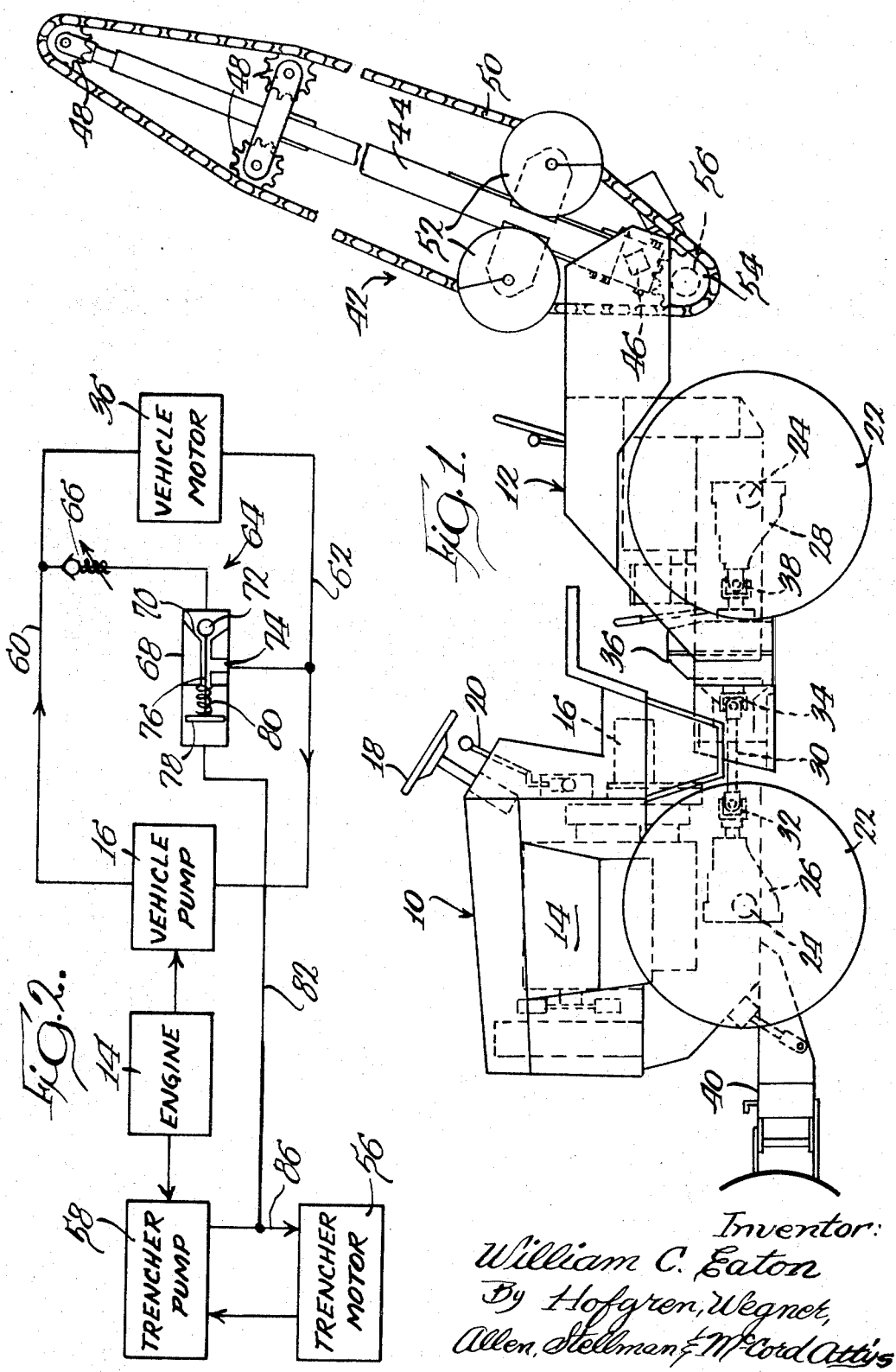

SPEED CONTROL SYSTEM FOR VEHICLE MOUNTING A WORK PERFORMING DEVICE

BACKGROUND OF THE INVENTION

Recent years have seen an increasing use of hydrostatic transmissions in various vehicles such as tractors or the like due to the obvious advantage of their being settable to an infinite number of speeds. Such a characteristic is of particular advantage in that vehicles which bear a work performing means such as a trenching device which will normally be moved across the ground at as fast a rate as possible without overloading the work performing means. Thus, where the load is relatively constant, the speed of the vehicle may be set with complete precision.

However, very few situations are encountered in practice where the load for such work performing means remains relatively constant. For example, in trenching applications, the nature of the ground in which a trench is being dug will vary from time to time and even if the same does not appreciably vary, when the boom of a trencher is maintained at a constant attitude with respect to the vehicle, a change in the terrain may tend to cause the boom to "dig in" to the ground thereby increasing the amout of work required.

SUMMARY OF THE INVENTION

It is the principal object of the invention to provide a new and improved speed control system for vehicles mounting work performing means as a trencher for controlling the speed of the vehicle inversely with the work to be performed by the work performing means. More particularly, it is an object of the invention to provide such a speed control system for a vehicle employing a hydrostatic transmission.

The exemplary embodiment of the invention achieves the foregoing in a vehicle having ground engaging propulsion means driven by a hydraulic motor receiving hydraulic fluid under pressure from a hydraulic pump, both normally forming part of a conventional hydrostatic transmission. According to the invention, a bypass line about the hydraulic motor is established and the flow rate through the same is varied according to the amount of work being required of a work performing means carried by the vehicle and adapted to be operated as the vehicel moves across the ground or the like.

According to one embodiment, the amount of work to be performed by a work performing means such as a trencher, is determined by sensing the pressure between the hydraulic pump and the hydraulic motor of the vehicle, it being recognized that as the work to be performed by a trencher increases, an increased drag will be placed upon the vehicle resulting in a buildup of pressure on the high pressure side of the hydraulic motor. A sensed increase in pressure is then employed to decrease the speed of the hydraulic motor and thus the speed of the vehicle. Specifically, a hydraulic fluid bypass is established in parallel with the hydraulic motor and in the line is an overflow valve of the type that will remain closed until a predetermined pressure differential across the same exists, at which time it will open. According to the preferred embodiment, the pressure at which such valve will open may be adjusted and when the same opens, the bypass route is established for hydraulic fluid under pressure causing the hydraulic motor to slow down thereby decreasing the speed of the vehicle.

In addition, the bypass line may include a bypass control valve which may be responsive to operation of the trencher or other work performing device to activate the bypass line. According to one embodiment, the bypass control valve is a piston operated valve connected to the high pressure side of a hydraulic motor for the trencher and operable to open when normal digging pressures upstream of the trencher motor exist.

Other objects and advantages will become apparent from the following specification taken in conjunction with the accompanying drawings.

DESCRIPTION OF THE DRAWINGS

FIG. 1 is a side elevation of a vehicle embodying a speed control system made according to the invention; and FIG. 2 is a schematic of the speed control system.

DESCRIPTION OF THE PREFERRED EMBODIMENT

A speed control system according to the invention is embodied in an articulated vehicle having a first frame, generally designated 10, and a second frame, generally designated 12. Included on the first frame 10 is a power plant 14 which drives a plurality of hydraulic pumps including a conventional hydraulic piston pump 16. Additionally associated with the first frame 10 is a steering means 18 and a namually operable speed control means 20.

Both of the frames 10 and 12 mount the wheels 22 on axles 24 associated with respect to differentials 26 and 28. The differential 26 receives rotary power via drive shaft 30 which is coupled by a universal joint 32 to the differential 26 and a universal joint 34 to a hydraulic motor and transmission 36 which is driven by the piston pump 16. The hydraulic motor and transmission 36 is connected by means of a universal joint 38 to provide rotary power to the differential 28.

As illustrated in FIG. 1, the forward end of the first frame mounts plow means 40 which form no part of the present invention while the second frame 12 mounts a trenching apparatus, generally designated 42.

While in the exemplary embodiment, the trencher 42 is shown as a work performing means mounted on the vehicle, as will become apparent hereinafter, the invention is not so limited. For example, the work performing means could be most any type of device which performs work as the vehicle moves along the ground and which will increase the drag on the vehicle as work requirements increase.

In any event, the work performing means in the form of the trencher 42 comprises a boom 44 which is mounted on a shaft 46 which in turn is pivotally mounted on the second frame 12. Various idler means 48 support a trenching chain 50. Additionally, there are provided augers 52 for clearing excavated material away from the trench when the trenching device is pivoted about the axis provided by the shaft 46 to a trenching position. A drive for the chain 50 is provided by a driven sprocket 54 which is driven by a hydraulic motor 56.

With reference to FIG. 2, the speed control system will now be described. The same takes advantage of the wellknown fact that as the load on a hydraulic motor increases, the pressure will increase at the inlet or high pressure side thereof. Thus, the high pressure side of a hydraulic drive motor will be a measure of the work requirements imposed upon the same by work performing means that it is driving.

As can be seen, the power plant 14 drives not only the hydraulic piston pump 16, but a hydraulic pump 58 as well which provides hydraulic fluid under pressure for the trencher motor 56.

The high pressure line from the vehicle pump 16 to the hydraulic motor and transmission 36 is designated 60 while the return, or low pressure line, is designated 62. Bypassing the hydraulic motor and transmission 36 is a bypass line, generally designated 64, and which is composed of an adjustable overflow valve 66 in series with a pilot operated bypass control valve 68. Assuming for the moment that the valve 68 is in an open condition, the pressure at which the bypass line 64 will begin to pass hydraulic fluid under pressure may be selectively controlled by suitable adjustment of the adjustable overflow valve 66. Thus, if the pressure in the line 60 is below that required to open the valve 66, the bypass line 64 will not pass fluid under any circumstances so that the pressure setting of the valve 66 sets a minimum pressure at which the line may become effective thereby setting a minimum speed for the vehicle at which the bypass may become effective.

The control valve 68 includes a valve seat 70 and a valve member 72. The outlet 74 of the valve 68 is connected to the low poressure line 62 to complete the bypass path and a piston rod 76 having a piston 78 on one end is connected to the valve member 72 to serve as an operator for the same. A spring 80 is provided to normally bias the valve member 72 towards a closed position. Suitable seals (not shown) carried by the piston 78 and surrounding the rod 76 to the left of the outlet 74 respectively isolate the left side of the piston and the outlet 74 from the right side of the piston 78. To open the valve 68, hydraulic fluid under pressure is applied against the piston 78 whereupon the same will move against the bias of the spring 80 and carry the valve member 72 away from the valve seat 70.

To apply pressure to the piston 78, there is provided a line 82 connected to the high pressure line 86 for the trencher hydraulic motor 56. The line 82 serves as a means for sensing when the trencher is operating by conveying the pressure at the high pressure side of the trencher hydraulic motor 56 to the piston 78 to ultimately move the valve member 72 away from the seat 70 to activate the bypass line to control vehicle speed.

With the foregoing construction in mind, the manner of operation will be described. It will be recognized that the speed of the vehicle motor 36 and thus the vehicle speed will be proportional to the volume of oil circulated in the hydraulic loop per unit of time. The torque the hydraulic motor 36 develops will be proportional to the fluid pressure differential across the motor 36. The speed control system described above introduces a modifying factor into the effect of pressure differential which is seen by the hydraulic motor 36 to ultimately control vehicle speed.

In a typical installation, the components are arranged such that the bypass control valve 68 will open at, for example, 500 psi to activate the bypass line. Those skilled in the art will recognize that during normal trencher operations, pressure in the line 86 will exceed 1,000 psi. Thus, for normal operation of the trencher, the bypass line will be activated.

The valve 66 will be set to open at pressures in excess of some predetermined value. Normally, the setting will be such that the hydraulic motor 36 will be permitted to develop sufficient torque to force the trencher into the soil at a rate which will require substantially full horse power output of the engine 14. In a tpical case, a 450 psi setting will serve the purpose. Thus, as the trencher encounters harder digging or unevenness of terrain causes the trencher to bite more deeply into the ground, there will be a corresponding rise is pressure in the line 60 due to the increased drag on the vehicle and the hydraulic motor 36. The valve 66 will open to permit fluid to bypass the motor 36 thereby slowing the machine temporarily to permit the trencher to clear itself.

One special advantage of the system is due to the fact that the pressure drop across the valve 66 will be in proportion to the flow rate of hydraulic fluid through the same. Thus, it is possible to select a pressure setting for the valve 66 for average conditions while permitting an increase in effective pressure across the hydraulic motor 36 by increasing the flow of hydraulic fluid from the pump 16. Thus, a system providing field flexibility which enjoys the inherent reliability of a relief valve is provided.

I claim

1. In a vehicle having ground engaging propulsion means and a variable speed hydraulic motor for driving the same, a hydraulic pump for providing hydraulic fluid under pressure to the vehicle motor, a work performing means adapted to perform work as the vehicle moves along the ground, the improvement comprising: means for sensing the amount of work to be performed by the work performing means and for establishing a hydraulic fluid bypass about said hydraulic motor when the amount of work to be performed by the work performing means increases to decrease the speed of the vehicle.

2. The invention of claim 1 wherein said sensing and establishing means comprises a hydraulic conduit in parallel with said vehicle motor and valve means in said conduit; said valve means being operable to open when a predetermined pressure differential exists across the same.

3. The invention of claim 2 further including a control valve in said conduit; and means for opening said control valve when said work performing means is operative.

4. The invention of claim 2 wherein said valve means is adjustable whereby the pressure differential necessary to cause the same to open may be selectively varied.

5. A vehicle comprising: a frame; propulsion means mounted on said frame; a hydraulic vehicle drive motor connected to said propulsion means and operable when energized to cause said vehicle to move; a source of hydraulic fluid under pressure; means connecting said source to said hydraulic motor; work performing means connected to said frame to be movable with said vehicle and to perform work while said vehicle is moving; drive means for said work performing means including a hydraulic work performing motor adapted to receive hydraulic fluid under pressure; and vehicle speed control means comprising a bypass line across said hydraulic vehicle drive motor including an overflow valve for controlling the flow rate of hydraulic fluid through said bypass line, a bypass control valve in series therewith, and means connected to the high pressure side of said hydraulic work performing motor for sensing the pressure thereat and for opening said bypass control valve to permit diversion of hydraulic fluid from said hydraulic vehicle drive motor to thereby control the speed of the same and the speed of the vehicle.

* * * * *